May 5, 1925.
E. A. CONNER
1,536,661
CABLE AND METHOD OF MAKING THE SAME
Filed April 27, 1922  2 Sheets-Sheet 1
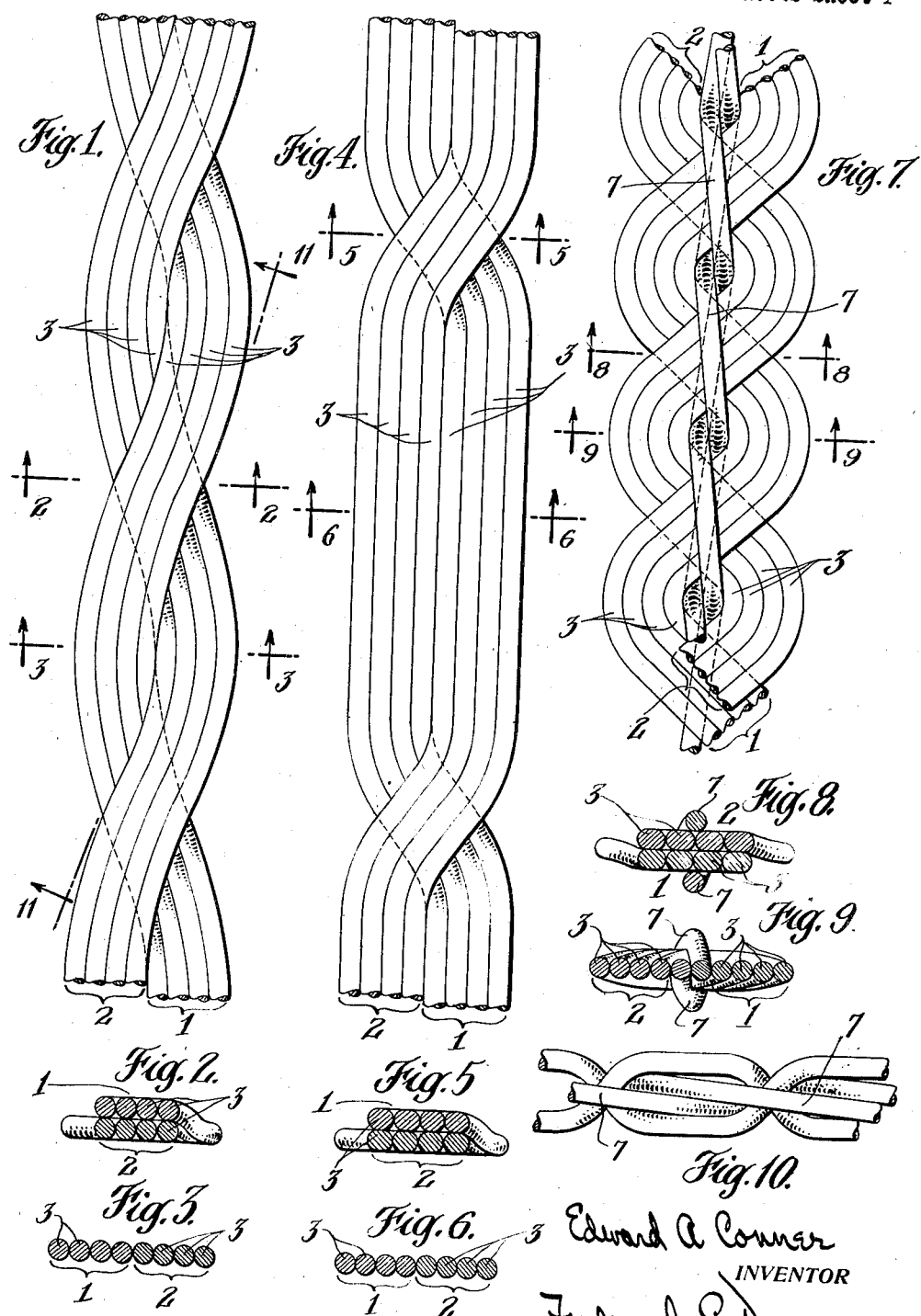

May 5, 1925.                                                          1,536,661
E. A. CONNER
CABLE AND METHOD OF MAKING THE SAME
Filed April 27, 1922          2 Sheets-Sheet 2
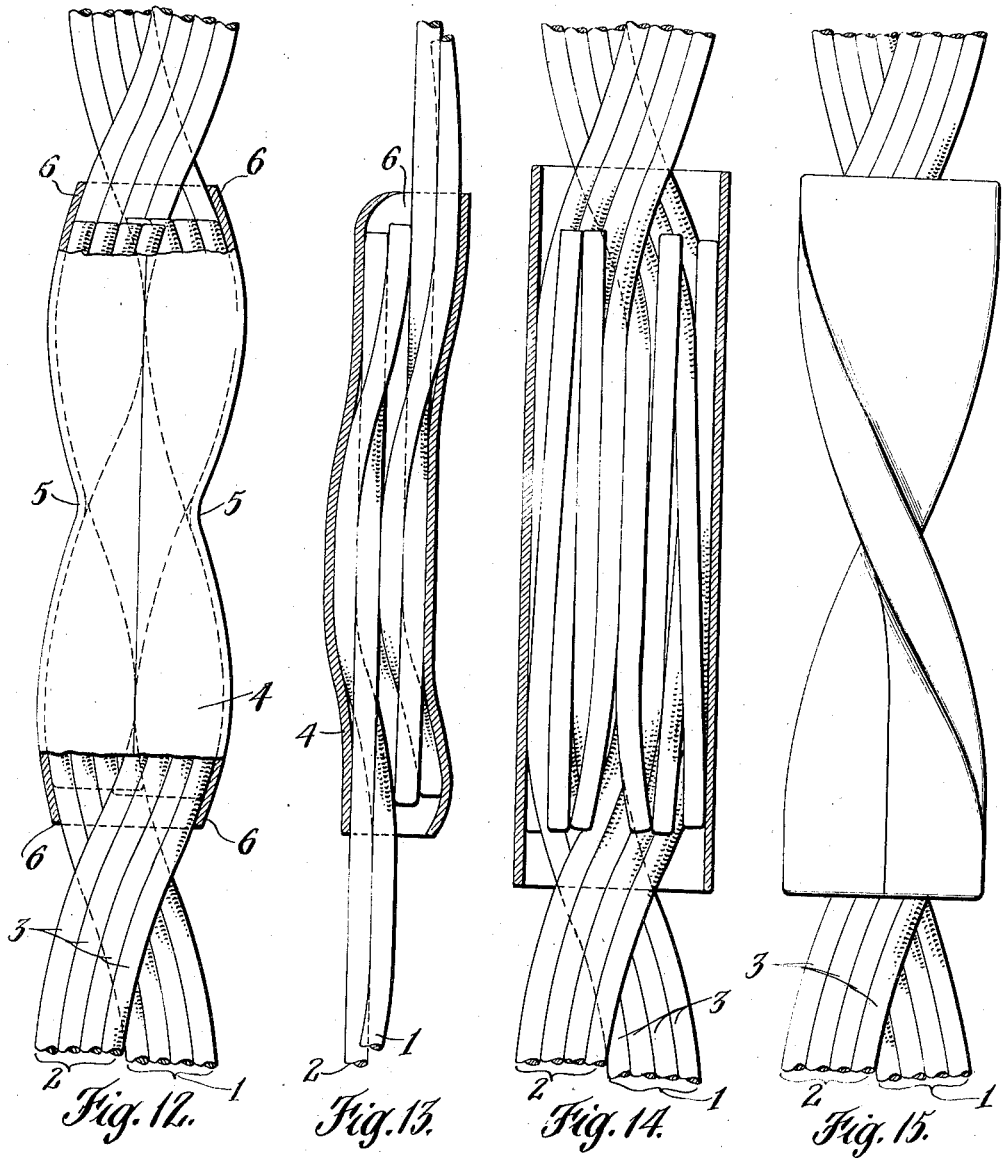
Edward A. Conner INVENTOR
BY Frederick S. Duncan
ATTORNEY Patented May 5, 1925.

1,536,661

UNITED STATES PATENT OFFICE.

EDWARD A. CONNER, OF BRIDGEPORT, CONNECTICUT, ASSIGNOR TO AMERICAN CHAIN COMPANY, INC., A CORPORATION OF NEW YORK.

CABLE AND METHOD OF MAKING THE SAME.

Application filed April 27, 1922. Serial No. 556,840.

*To all whom it may concern:*

Be it known that I, EDWARD A. CONNER, a citizen of the United States, residing at Bridgeport, in the county of Fairfield, State of Connecticut, have invented certain new and useful Improvements in Cables and Methods of Making the Same, of which the following, taken in connection with the accompanying drawings, is a specification.

One object of the invention is the construction of a flat ribbonlike or braidlike cable which can be made if desired without employing braiding machines or processes or mechanisms which involve the use of a weaving shuttle.

Another object is the construction of a cable which is adaptable for use as a reinforcement for vehicle tire beads, and which can be cheaply made, and for the particular use as a reinforcement for tire beads is adapted to effect a secure anchorage in the bead.

Another object is the construction of a flat cable which will be pronouncedly flexible in all directions and which can be easily joined by a mechanical union.

Another object is the construction of a flat cable which may be used in connection with sheaves for transmitting power as in the case of elevator drums, power transmission pulleys, and the like.

The cable consists essentially of a plurality, preferably two, of flat strands, each strand composed of a plurality of individual wires lying side by side, the strands being plaited or twined together in such manner that each crosses alternately over and under the other and with the consequence that they lie flat against each other at each cross-over portion, while their edges abut between cross-over portions.

In the drawings:

Figure 1 is a plan view of one form in which the invention may be embodied.

Fig. 2 is a view in transverse section on the line 2—2 of Fig. 1.

Fig. 3 is a view in transverse section on the line 3—3 of Fig. 1.

Fig. 4 is a plan view of another form in which the invention may be embodied.

Fig. 5 is a view in transverse section on the line 5—5 of Fig. 4.

Fig. 6 is a view in transverse section on the line 6—6 of Fig. 4.

Fig. 7 is a plan view of still another form in which the invention may be embodied.

Fig. 8 is a view in transverse section on the line 8—8 of Fig. 7.

Fig. 9 is a view in transverse section on the line 9—9 of Fig. 7.

Fig. 10 is a side view of the form shown in Fig. 7.

Fig. 11 is a view on the line 11—11 of Fig. 1.

Fig. 12 is a view of the form shown in Fig. 1 showing a union of two free ends by means of a ferrule partly broken away.

Fig. 13 is a side view of the union shown in Fig. 12 with the ferrule broken away at the side.

Fig. 14 is a view of still another form of union of two free ends showing a ferrule, for the purpose partly broken away to more clearly show the relation of the free ends.

Fig. 15 is a plan view of a completed union of the form shown in Figure 14.

In Fig. 1, the strands numbered 1 and 2 respectively are each composed of a plurality, for instance four, of individual wires numbered 3 lying side by side, each individual wire following the curvature of its neighbor throughout. The individual wires are prevented from riding up on one another by the fact that each strand crosses alternately over and under the other and also by the fact that all the wires are of equal length. It will be obvious that in spite of the fact that the structure as a whole is substantially flat, it shows a high degree of flexibility, not only flatwise, but edgewise.

In addition the exterior of the cable presents an irregularity of surface which makes it especially suitable for tire bead reinforcement, inasmuch as the plastic substance, usually rubber, in which the reinforcement is customarily embedded under pressure may be forced into the depressions, thus creating a firm anchorage for the reinforcement. Since the cable is flat and inasmuch as it covers a relatively broad annular area when placed in a tire bead in the usual manner, its strength is thus distributed most advantageously to serve as a tire reinforcement, more especially for tires of the straight side type. In tires of this type the bead tends to cant transversely of itself one way or the other, depending upon the direction in which laterally directed forces are directed against the tire, as for instance in going around curves. It is desirable therefore, that any reinforcement for such a bead be placed as near both edges thereof as is possible. The cable of the present invention being flat, it consequently serves this purpose. Furthermore, when edgewise flexure takes place, all of the individual wires are equally stressed, this by reason of the fact that each wire crosses and re-crosses from one side to the other of the cable and the average tensile stress in all of the wires, is, therefore, equal regardless of the edgewise curvature of the cable as a whole, and further owing to the fact that all wires are of equal length.

Furthermore, the cable is adaptable for the ready uniting of two free ends thereof. Each edge as shown follows an escalloped line with the indentations opposite each other and the indentations offer a means of securely anchoring to the ends various kinds of unions such as a sleeve or ferrule shown in Figs. 12 and 13. As shown in these figures the two free ends to be united are passed into opposite ends of ferrule 4 and overlapped so that the indentations of the two ends register with each other, whereupon the ferrule 4 is crimped into the registering indentations as shown at 5—5. The ferrule may be if desired long enough to permit the ends thereof to be also crimped into indentations as indicated at 6.

Another method of joining the two free ends of this style of cable is shown in Figs. 14 and 15. As shown in these figures, the individual wires of the ends to be joined may be first combed out or otherwise straightened. The ends are then inserted into opposite ends of the ferrule until they intermesh with each other, whereupon the ferrule is given a 180 degree twist as shown in Fig. 15 whereby it firmly grips the intermeshed wires and firmly joins the ends of the cable together.

The modification shown in Fig. 4 is essentially similar to the form shown in Fig. 1. In the form shown in Fig. 4, however, there is present a modification which consists in a relative lengthening of the distances between cross-overs, the lengthening being carried if desired to such an extent that the individual wires between the cross-overs are substantially straight.

In the modification shown in Figs. 7, 8, and 9 reinforcing strands 7 are made use of. Two such reinforcing strands are shown, although the number is optional and may be more or less than two. A reinforcing strand is interlaced in the structure by passing it alternately in opposite directions between the adjacent edges of the two cable strands. If two reinforcing strands be used, they cross each other where they pass between the adjacent edges of the cable strands. This reinforcing strand, or reinforcing strands as the case may be, insures a compact structure and prevents all likelihood of the individual wires of the cable strands riding over each other under such stresses as are within the limits created by the strength of the material.

Having thus described my invention, I claim:

1. A cable consisting of two flat strands each of which is composed of a plurality of wires lying side by side, the said strands being so plaited together that their flat surfaces lie in contact with each other at points of crossing.

2. A cable structure composed of a section of cable consisting of two flat strands, each strand being composed of a plurality of wires lying side by side, the strands being twined together to form a substantially flat structure, the edges of which present an escalloped line, the ends of the cable section being overlapped to form a ring and bound together by a ferrule crimped to correspond with the indentations of the escalloped edges.

3. An annular cable structure adapted for use as a reinforcement for tire beads, composed of a section of cable, the said cable being formed of two strands twined together to form a substantially flat structure with escalloped edges, and each strand being composed of a plurality of wires lying side by side, the ends of the said section of cable being overlapped to close the ring and bound together by a ferrule crimped into the indentations of the said escalloped edges.

4. A flat cable composed of two flat strands twined together, each strand being composed of a plurality of wires lying side by side, the said strands crossing each other in such manner that their flat sides lie in contact with each other.

5. The method of making cable which consists in forming a plurality of wires into two flat strands and twining the strands thus formed together to form a substantially flat structure, the twining being carried out so that the flat sides of the strands lie in contact with each other at points of crossing.

6. The method of making cable which consists in forming two flat strands of a plurality of wires, twining the strands thus formed together with their flat sides only in contact at points of crossing, and interlacing in the structure, as it is formed, another strand in such manner that it passes between adjacent edges of the first mentioned strands.

In testimony whereof I have signed this specification at Bridgeport, in the county of Fairfield, State of Connecticut, this 12th day of April, 1922.

EDWARD A. CONNER.

Signed in the presence of:
GEORGE MOSHER, Jr.
BESSIE BUTTRICK ROBINSON.